(12) United States Patent
Mizuta et al.

(10) Patent No.: US 8,574,746 B2
(45) Date of Patent: Nov. 5, 2013

(54) FILM-COVERED ELECTRICAL DEVICE AND ASSEMBLED BATTERY

(75) Inventors: Masatomo Mizuta, Sagamihara (JP); Shunji Noda, Sagamihara (JP)

(73) Assignee: NEC Corporation, Tokyo (JP)

( * ) Notice: Subject to any disclaimer, the term of this patent is extended or adjusted under 35 U.S.C. 154(b) by 192 days.

(21) Appl. No.: 12/920,448

(22) PCT Filed: Mar. 12, 2009

(86) PCT No.: PCT/JP2009/054802
§ 371 (c)(1),
(2), (4) Date: Dec. 6, 2010

(87) PCT Pub. No.: WO2009/113634
PCT Pub. Date: Sep. 17, 2009

(65) Prior Publication Data
US 2011/0076529 A1 Mar. 31, 2011

(30) Foreign Application Priority Data

Mar. 14, 2008 (JP) ................................. 2008-066505

(51) Int. Cl.
*H01M 2/08* (2006.01)
*H01M 10/04* (2006.01)

(52) U.S. Cl.
USPC ........................................ 429/157; 429/185

(58) Field of Classification Search
USPC ................................................ 429/157, 185
See application file for complete search history.

(56) References Cited

U.S. PATENT DOCUMENTS 6,048,639 A 4/2000 Sonozaki et al.

FOREIGN PATENT DOCUMENTS

| JP | 10-055792 A | 2/1998 |
|---|---|---|
| JP | 11-097070 A | 4/1999 |
| JP | 11-213964 A | 8/1999 |
| JP | 2000-100399 A | 4/2000 |
| JP | 3070035 U | 4/2000 |
| JP | 2000-200585 A | 7/2000 |
| JP | 2000-223087 A | 8/2000 |
| JP | 2002-056835 A | 2/2002 |
| JP | 2002-237279 A | 8/2002 |
| JP | 2002-319374 A | 10/2002 |
| JP | 2002-324524 A | 11/2002 |

(Continued)

OTHER PUBLICATIONS

Computer-generated English translation of JP-2002-237279, from the Japanese Patent Office website (doc. date Aug. 2002).*

(Continued)

*Primary Examiner* — Stephen J. Kalafut
(74) *Attorney, Agent, or Firm* — Sughrue Mion, PLLC

(57) ABSTRACT

The film-covered electrical device of the present invention includes covered portion ($S_1$) where a portion of covering film (6) is folded to cover end surface (5d) of covering film (5) through which metal layer (5b) is exposed, non-covered portion ($S_2$) where end surface (5d) of covering film (5) is not covered with folded covering film (6), sealing portion (8) (a first sealing portion) produced by thermally fusing thermally-fusible resin layer (6c) of covering film (6) and thermally-fusible resin layer (5c) of covering film (5), and portion B (a second sealing portion) produced by thermally fusing protective layer (5a) of covering film (5) and thermally-fusible resin layer (6c) of covering film (6), wherein sealing portion (8) (the first sealing portion and non-covered portion ($S_2$)) is provided with a safety valve for releasing internal gas when a rise in internal pressure occurs.

20 Claims, 8 Drawing Sheets

(56) References Cited

FOREIGN PATENT DOCUMENTS

| | | | |
|---|---|---|---|
| JP | 2002-367574 | A | 12/2002 |
| JP | 2003-242942 | A | 8/2003 |
| JP | 2003-288883 | A | 10/2003 |
| JP | 2004-055154 | A | 2/2004 |
| JP | 2006-236605 | A | 9/2006 |
| JP | 2006-294309 | A | 10/2006 |
| JP | 2006-351431 | A | 12/2006 |
| JP | 2007-265879 | A | 10/2007 |
| JP | 2009-224147 | A | 10/2009 |

OTHER PUBLICATIONS

Computer-generated English translation of JP-2006-294309, from the Japanese Patent Office website (doc. date Oct. 2006).*

Computer-generated English translation of JP-2006-351431, from the Japanese Patent Office website (doc. date Dec. 2006).*

Computer-generated English translation of JP-2007-265879, from the Japanese Patent Office website (doc. date Oct. 2007).*

Office Action issued Jul. 23, 2013, by Japanese Foreign Patent Office in counterpart Japanese Application No. 2010-502879.

* cited by examiner

FILM-COVERED ELECTRICAL DEVICE AND ASSEMBLED BATTERY

CROSS REFERENCE TO RELATED APPLICATIONS

This application is a National Stage of International Application No. PCT/JP2009/054802, filed on Mar. 12, 2009, which claims priority from Japanese Patent Application No. 2008-066505, filed on Mar. 14, 2008, the contents of all of which are incorporated herein by reference in their entirety.

TECHNICAL FIELD

The present invention relates to a film-covered electrical device and an assembled battery which are such that an electrical device element represented by a battery and a capacitor is housed in a covering film.

BACKGROUND ART

In recent years, batteries as power sources of mobile devices and the like have been strongly required to have light weight designs and thin designs. Therefore, also for covering materials for batteries, those using metal thin films or laminated films obtained by laminating a metal thin film and a thermally-fusible resin film have come to be used in place of conventional metal cans having limits in terms of light weight and thin designs. Laminated films are capable of adopting lighter weight designs, thinner designs and more free shapes than metal cans.

As an example of a laminated film used in a covering material for a battery, there is a type in which a thermally-fusible resin film which is a heat sealed layer is laminated on one surface of an aluminum thin film, which is a metal thin film, and a protective film is laminated on the other surface. The laminated film encloses a battery element composed of a positive electrode, a negative electrode, an electrolyte and the like so that the thermally-fusible resin film is disposed on the inner side and thermally fuses the circumference of the battery element, thereby hermetically sealing (hereinafter simply called sealing) the battery element. For example, a polyethylene film and a polypropylene film are used as the thermally-fusible resin film, and for example, a nylon film and a polyethylene terephthalete film are used as the protective film. A lead terminal is connected to each of the positive electrode and negative electrode of the battery element, and these lead terminals are caused to extend to the outside of the covering material.

If a voltage outside a standard range is applied to a battery during the use of the battery, there may sometimes occur the case where gas is generated by the electrolysis of an electrolyte solvent and the inner pressure of the battery rises. Furthermore, if a battery is used at high temperatures outside a standard range, substances which become a source of gas due to decomposition and the like of the electrolyte may be produced.

The generation of gas within a battery brings about a rise in the internal pressure of the battery. To suppress a rise in internal pressure, many batteries using a metal can as the covering material have a pressure safety valve which lets the gas escape to the outside when the inner pressure of the battery has risen. Also in a film-covered battery using a film as covering material, the provision of a pressure safety valve has been studied. For example, JP2000-100399A discloses a film-covered battery in which a portion at high thermal fusion temperature and a portion at low thermal fusion temperature are provided in a sealing region of the film and the portion at low thermal fusion temperature is caused to function as a safety valve. JP11-97070A discloses a film-covered battery which is such that a non-thermally-fusible resin film is interposed in part of a thermally-fused portion. In both cases, a portion where the thermal fusion strength is weakened is formed in the covering material and this portion is given the function of a safety valve.

JP2002-56835A discloses a configuration in which part of the outer shape of a thermally-fused portion is cut off from the outside. JP10-55792A discloses a configuration in which an unbonded portion is provided in part of a sealed side and the dimension of this unbonded portion is increased on the inner side of a battery and decreased on the outer side thereof. In these configurations, a portion having a shape which is such that the width of the thermally-fused portion in the direction from the inner side of the battery to the outer side thereof becomes narrow, is set in part of the thermally-fused portion, and this portion is caused to function as a safety valve.

On the other hand, it is also very important to take insulation measures for a film-covered battery.

FIG. 1 shows a schematic plan view of an example of a film-covered battery based on the technique related to the present invention in which a laminated film is used. FIGS. 2A and 2B show partial sectional views in Line e-e of FIG. 1. FIG. 2A shows the condition before the adhering of a peripheral protective tape and FIG. 2B shows the condition after the adhering of a peripheral protective tape.

Laminated film 100 is a three-layer laminated film which is such that a thermally-fusible resin film, which is thermally-fusible resin layer 104, is laminated on one surface of an aluminum thin film, which is metal layer 103, and protective film 102 is laminated on the other surface.

Film-covered battery 110 shown in FIG. 1 uses two laminated films 100, which are upper laminate 100a and lower laminate 100b. Two laminated films 100 are such that thermally-fusible resin layers 104 are caused to face each other and in sealing position 108 on the circumference of battery element 120, upper laminate 100a and lower laminate 100b are thermally fused, whereby battery element 120 is sealed.

However, if this state is kept as is, as shown in FIG. 2A, metal layer 103 becomes exposed from each section of upper laminate 100a and lower laminate 100b (in the figure, exposed portion 103a of the metal layer). If an assembled battery is fabricated in this state, the risk that exposed portion 103a of the metal layer will come into contact with an adjacent film-covered battery or will come into contact with a surrounding conductive member, increases. Therefore, insulation measures have been taken by covering this exposed portion 103a of the metal layer with peripheral protective tape 101, as shown in FIG. 2B.

DISCLOSURE OF THE INVENTION

However, the method by which exposed portion 103a of the metal layer is covered with peripheral protective tape 101 has posed the problem that the cost of peripheral protective tape 101 and the work cost for sticking peripheral protective tape 101 are high.

In particular, as described above, when peripheral protective tape 101 is adhered to a battery having a safety valve of a type which is such that the gas in the battery is released by exfoliating a portion where covering films are thermally fused together, it is necessary that the tape be made to adhere to avoid the portion where the safety valve is formed so that the exfoliation operation of the thermally-fused portion is not impeded thereby. Because of this, the number of tape pieces } to be adhered and the frequency of adhering increase, and this has made the work complicated.

Therefore, the present invention has an object to provide a film-covered electrical device and an assembled battery which have means capable of ensuring insulating properties without affecting the operation of a safety valve and whose manufacturing cost is reduced.

To achieve the above-described object, a film-covered electrical device of the present invention includes: an electrical device element formed by laminating a plurality of positive electrode plates and a plurality of negative electrode plates in an opposed condition, and a covering film having a metal layer, a resin layer having thermal fusion properties which is provided on one surface of the metal layer and a protective layer provided on the other surface of the metal layer. In the film-covered electrical device which houses the electrical device element by thermal fusion of a peripheral edge portion of the covering film, one side of the peripheral edge portion includes both a folded region having a folded portion and a non-folded region not having the folded portion, and a safety valve which releases gas when a rise in the internal pressure in the film-covered electrical device occurs, is provided in the non-folded region.

The present invention can provide a film-covered electrical device and an assembled battery which have means capable of ensuring insulating properties without affecting the operation of a safety valve and whose manufacturing cost is reduced.

BEST MODE FOR CARRYING OUT THE INVENTION

Next, exemplary embodiments will be described with reference to the drawings.

First Exemplary Embodiment

Figure 1:
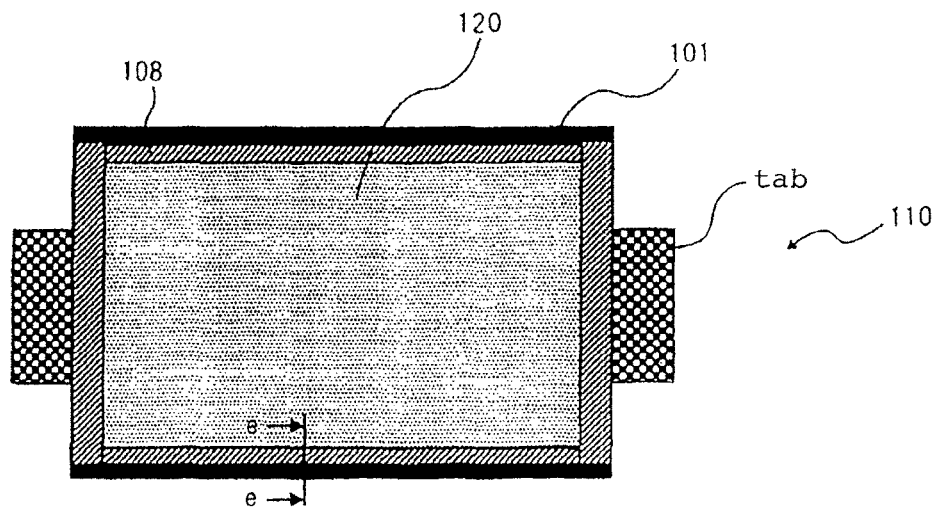
FIG. 1 is a schematic plan view of an example of a film-covered battery based on the technique related to the present invention in which a laminated film is used.
Figure 2A:
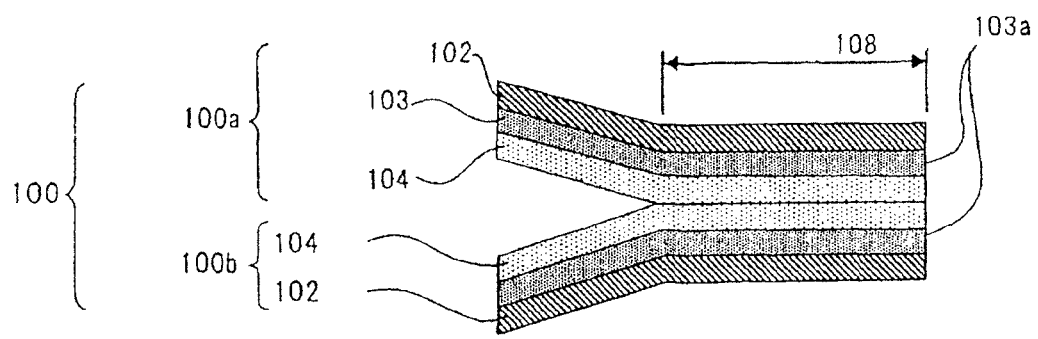
FIG. 2A is a partial sectional views along Line e-e of FIG. 1 and shows the condition before the adhering of a peripheral protective tape.
Figure 2B:
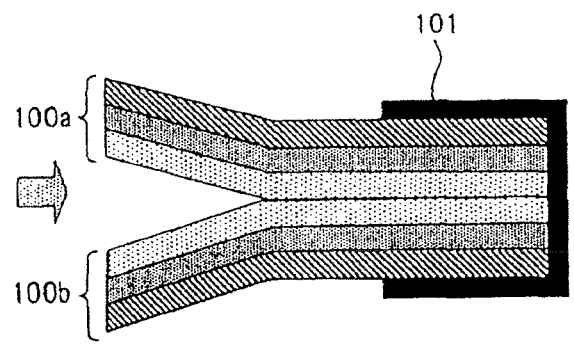
FIG. 2B is a partial sectional views along Line e-e of FIG. 1 and shows the condition after the adhering of a peripheral protective tape.
Figure 3:
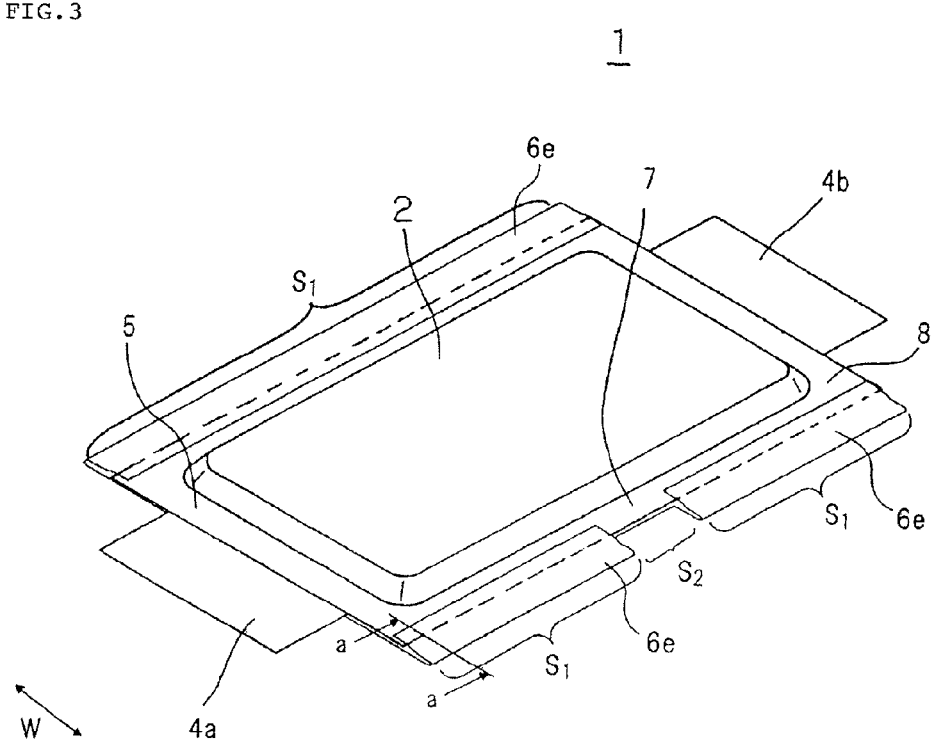
FIG. 3 is an external perspective view of a film-covered battery in the first exemplary embodiment.
Figure 4:
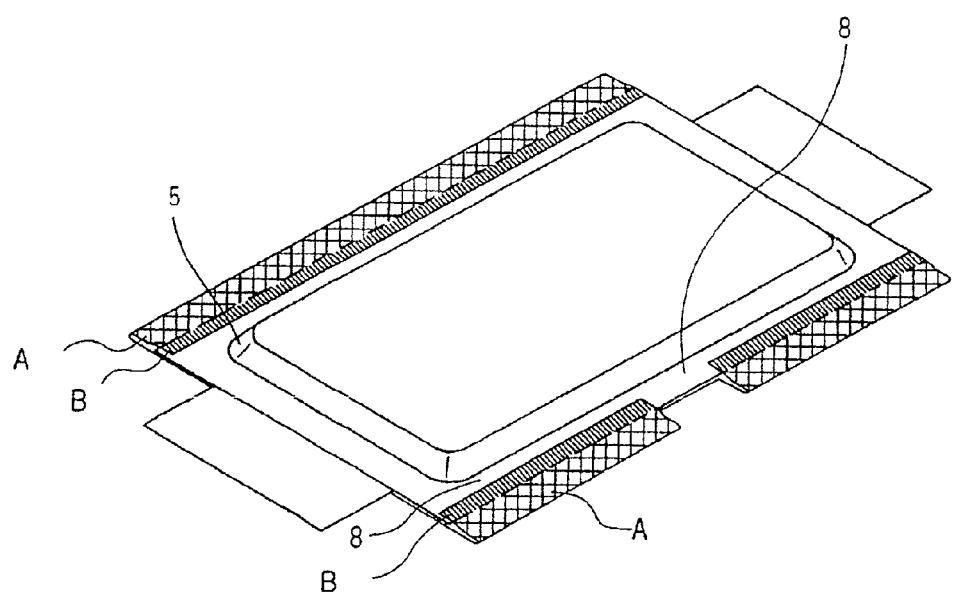
FIG. 4 is a diagram showing a region where thermally-fusible resin layers are thermally fused together in the film-covered battery of the first exemplary embodiment.
Figure 5:
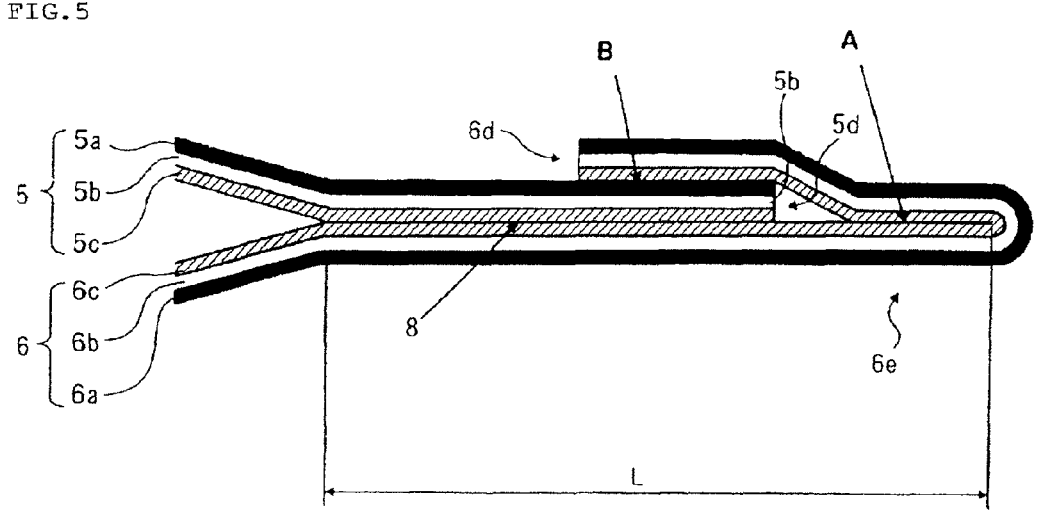
FIG. 5 is a partial sectional view along Line a-a shown in FIG. 3.

FIG. 3 is an external perspective view of a film-covered battery of this exemplary embodiment. FIG. 4 is a diagram showing a region where thermally-fusible resin layers are thermally fused together in the film-covered battery of this exemplary embodiment. FIG. 5 is a partial sectional view along Line a-a shown in FIG. 3.

Film-covered battery 1 houses battery element 2 and battery element 2 along with an electrolyte. The film-covered battery has a covering material composed of two laminated films 5, 6, positive electrode tab 4a and negative electrode tab 4b which extend outward from laminated films 5, 6 and safety valve 7.

Battery element 2 is formed by alternately stacking a plurality of positive electrode plates and a plurality of negative electrode plates via separators. Porous films formed by using a thermoplastic resin, such as polyolefin, and the like are used as the separators. The extending portions extend outward from the stacked region and no electrode material is applied to the extending portions. The extending portions of the positive electrode plates are collectively ultrasonic welded, whereby positive electrode collector portion 3a, which is a relay portion, is formed. Similarly, the extending portions of the negative electrode plates are collectively ultrasonic welded, whereby negative electrode collector portion 3b, which is a relay portion, is formed. At the same time, the connection of positive electrode tab 4a to positive electrode collector portion 3a and the connection of negative electrode tab 4b to negative electrode collector portion 3b are also performed by ultrasonic welding. In the present description, positive electrode collector portion 3a and negative electrode collector portion 3b may sometimes be collectively called collector portion 3, and positive electrode tab 4a and negative electrode tab 4b may sometimes be collectively called tab 4.

The covering material is formed from two laminated films 5, 6 which enclose battery element 2 by sandwiching battery element 2 from both sides of the thickness direction of battery element 2. Each of laminated films 5, 6 is formed by laminating a thermally-fusible resin layer having thermal fusion properties, a metal layer and a protective layer. Laminated films 5, 6 are such that battery element 2 is housed by the thermal fusing of sealing portion 8, which provides thermally-fused portions of laminated films 5, 6 so that a thermally-fusible resin layer made of PP (polypropylene) faces the inner side. Examples of materials capable of being used as protective layers 5a, 6a include polyester, such as polyethylene terephthalate, nylon (registered trademark) and polypropylene. Examples of materials capable of being used as thermally-fusible resin layers 5c, 6c include polypropylene and polyethylene.

A concavity which houses battery element 2 is formed in laminated film 5. This concavity may be formed as required.

Laminated film 6 is such that the width thereof in W direction in the figure is larger than in laminated film 5. This is because in film-covered battery 1 shown in FIGS. 3 and 4, laminated film 6 has folded portions 6e which are folded in both end portions of laminated film 6. The trimming position of laminated film 6 on a side where tab 4 does not extend outward is on the outer side compared to the trimming position of film 5 in order to form these folded portions 6e. In other words, the size of a side (the side from which tab 4 is caused to extend outward) orthogonal to this side is larger in laminated film 6 than in laminated film 5.

As shown in FIG. 3, the side of laminated film 6 on the side where safety valve 7 is not formed, has folded portion 6e along the full length of the side, whereas the side of laminated film 6 on the side where safety valve 7 is formed, has folded portions 6e only in part of the length of the side. That is, the side of laminated film 6 on the side where safety valve 7 is not formed, provides, along the full length of the side, covered portion $S_1$ in which end surface 5d on which metal layer 5b of laminated film 5 is exposed, is covered with folded portion 6e. In contrast to this, for the side of laminated film 6 on the side where safety valve 7 is formed, covered portion $S_1$ consisting of folded portion 6e is formed only on both sides of non-covered portion $S_2$ which becomes safety valve 7. In non-covered portion S2, end surface 5d where metal layer 5b is exposed is not covered with folded portion 6e.

Next, a description will be given of adhering together laminated film 5 and laminated film 6.

First, power generation element 2 and tab 4 are arranged beforehand between laminated film 5 and laminated film 6.

Next, in order to form folded portion 6e in laminated film 6, laminated film 6 is arranged with respect to laminated film 5 so that the portion which becomes folded portion 6e protrudes from laminated film 5. For the amount of this protrusion, it is ensured that the protrusion of the same width occurs for both the side of laminated film 6 on the side where safety valve 7 is not formed and the side of laminated film 6 on the side where safety valve 7 is formed.

Subsequently, folded portion 6e is formed by folding this protruding portion. As well, end surface 5d of laminated film 5 is covered with folded portion 6e of laminated film 6, whereby covered portion $S_1$ is formed. In this exemplary embodiment, folded portion 6e is folded as follows. That is, in the vicinity of the folding root of folded portion 6e, it is ensured that thermally-fusible resin layers 6c of folded portion 6e face each other (shaded portion A in FIG. 4, portion A in FIG. 5). In the front edge part of folded portion 6e, it is ensured that thermally-fusible resin layer 6c of folded portion 6e and protective layer 5a of laminated film 5 face each other (hatched portion B in FIG. 4, portion B in FIG. 5).

In this state, peripheral edge portions of laminated film 5 and laminated film 6 which face each other are adhered together by thermal fusion. That is, sealing portion 8 (a first sealing portion) of a peripheral portion of battery element 2, portion A (a third sealing portion) and portion B (a second sealing portion) are heated by a heater which is not shown. In sealing portion 8 (a first sealing portion), thermally-fusible resin layer 5c of laminated film 5 and thermally-fusible resin layer 6c of laminated film 6 are bonded together by thermal fusion. In portion A (a third sealing portion), thermally-fusible resin layers 6c of folded portion 6e are bonded together by thermal fusion.

The above description was given of the method which involves forming folded portion 6e beforehand and then performing thermal fusion for all members. However, the present invention is not limited by this. For example, it is possible to adopt a method which involves thermally fusing a sealing portion 8 first, then forming folded portion 6e, and performing thermal fusion for portion A and portion B. The thermal fusion of portion A and portion B may be performed simultaneously or may be separately performed.

In all methods, the present invention ensures that it is possible to prevent metal layer 5b of end surface 5d from being exposed to the outside by forming covered portion $S_1$ where end surface 5d of laminated film 5 is covered with folded portion 6e as described above, and it is possible to the increase insulating properties. On the other hand, section 6d where metal layer 6b of folded portion 6e is exposed, faces in the direction of battery element 2. That is, folded portion 6e is folded so that section 6d where metal layer 6b is exposed, faces the inner side of film-covered battery 1. For this reason, even when a plurality of film-covered batteries 1 are arranged to be adjacent to each other and even when film-covered battery 1 is housed in a case made of metal, the possibility that section 6d comes into electrical contact with adjacent film-covered battery 1 and the metal case, is very low.

In laminated film 6, folded portions 6e are formed on both sides. However, on one side, folded portion 6e is formed only partially and is not formed in the remaining areas. That is, folded portion 6e is not formed in non-covered portion $S_2$ shown in FIG. 3. For this reason, in a portion corresponding to this non-covered portion $S_2$, bonding together laminated film 5 and laminated film 6 is performed only by the thermal fusion of sealing portion 8. Therefore, when portion B is strongly thermally fused, the bonding force in non-covered portion S2 obtained only by the thermal fusion of sealing portion 8 is weak by just the amount corresponding to the non-existence of portion A and portion B compared to the region where folded portion 6e is formed. That is, because of its weak bonding strength non-covered portion $S_2$ is exfoliated at low internal pressure compared to other bonded regions. Even when portion B is not strongly thermally fused, it is possible to provide a safety valve by providing a portion of weak exfoliation strength by inserting a publicly known conventional safety valve, for example, a film of dissimilar material quality in the non-covered portion.

Furthermore, this non-covered portion $S_2$ is not covered with laminated film 6. That is, the section of non-covered portion $S_2$ is not sealed by laminated film 6. If the section is sealed by laminated film 6, no gas is jetted because laminated film 6 is sealed even when the portion bonded by the thermal fusion of non-covered portion $S_2$ is exfoliated due to internal pressure. However, because the section of non-covered portion $S_2$ is not sealed by laminated film 6, gas is instantaneously jetted when the portion bonded by thermal fusion is exfoliated.

For this reason, non-covered portion $S_2$, which is sealing portion 8 (a first sealing portion) and which is not covered with laminated film 6, is exfoliated at an internal pressure that is lower than in other regions, and jets gas. Therefore, it is possible to cause non-covered portion $S_2$ to function as safety valve 7. In this non-covered portion $S_2$, metal layer 5b on end surface 5d becomes exposed. However, end surface 5d is arranged in a somewhat backward position because folded portion 6e is positioned in the direction in which folded portion 6e goes away from battery element 2, and hence it is possible to ensure safety. That is, in film-covered battery 1 of this exemplary embodiment, end surface 5d is prevented from coming into direct contact with surrounding members because folded portion 6e extends.

For this reason, folded portion 6e is provided only in part of laminated film 6, whereby it is possible to form a portion which becomes safety valve 7 in the remaining part.

As described above, according to this exemplary embodiment, it is possible to improve insulating properties by preventing the metal layer of a laminated film from being exposed without using a peripheral protective tape. Furthermore, according to this exemplary embodiment, it is possible to easily form a portion which becomes a safety valve in addition to improving the insulating properties.

Because of its small exfoliation strength non-covered portion $S_2$, which is not covered with laminated film 6, can be used as safety valve 7. On the other hand, in non-covered portion $S_2$, metal layer 5b of end surface 5d becomes exposed. However, because end surface 5d is arranged in a somewhat backward position compared to folded portion 6e, insulating properties for other members such as the battery are ensured. That is, in this exemplary embodiment, it is possible to ensure the insulating properties of an end surface where a metal layer is exposed without impeding the gas jetting from safety valve 7.

Second Exemplary Embodiment

Figure 6:
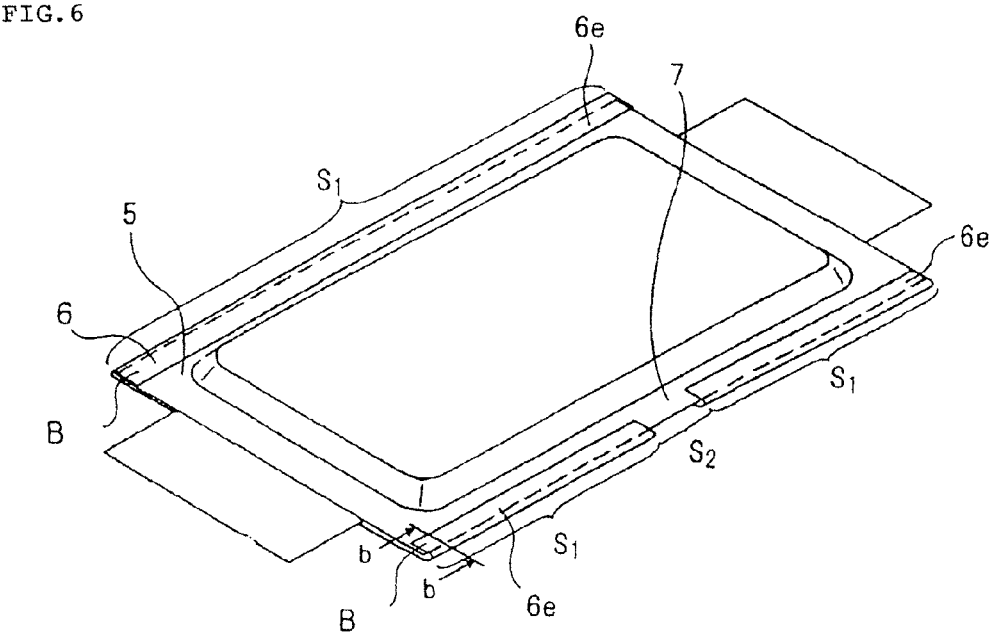
FIG. 6 is an external perspective view of a film-covered battery in the second exemplary embodiment.
Figure 7:
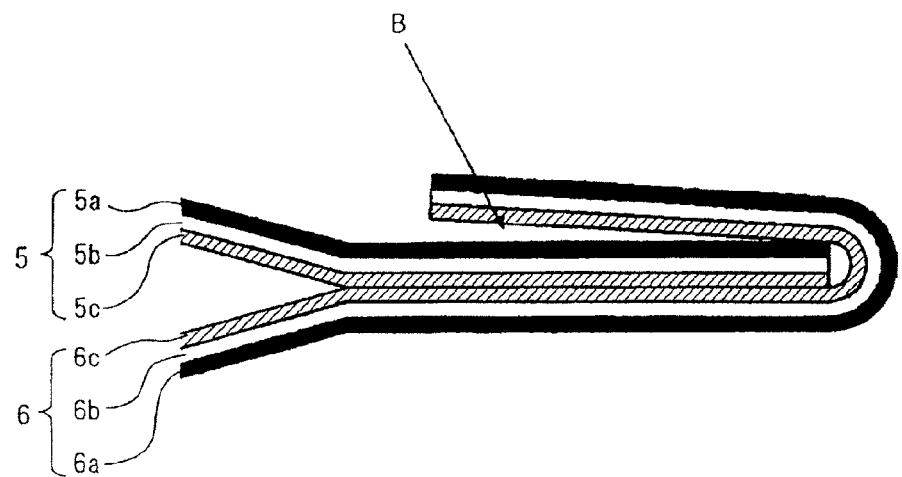
FIG. 7 is a partial sectional view along Line b-b shown in FIG. 6.

FIG. 6 is an external perspective view of a film-covered battery of this exemplary embodiment. FIG. 7 is a partial sectional view along Line b-b shown in FIG. 6.

This exemplary embodiment has the same configuration as the first exemplary embodiment with the exception that folded portion 6e of laminated film 6 is not provided with portion A (a third sealing portion) where thermally-fusible resin layers 6c are thermally fused together. Therefore, in the following description, the same members as in the first exemplary embodiment will be described with the aid of the same symbols as in the first exemplary embodiment, and detailed descriptions will be given only of points that are different from the first exemplary embodiment.

Film-covered battery 11 of this exemplary embodiment is not provided, on both sides thereof, with portion A where thermally-fusible resin layers 6c are thermally fused together. For this reason, it is possible to miniaturize the battery by just the amount corresponding to the non-existence of portion A compared to film-covered battery 1 of the first exemplary embodiment.

In portion B, thermally-fusible resin layer 6c of folded portion 6e is thermally fused to protective layer 5a of laminated film 5. An adhesive may be applied in order to increase the bonding strength. Or alternatively, ultrasonic fusion or bonding by use of an adhesive may be performed in addition to thermal fusion.

In the film-covered battery shown in FIGS. 6 and 7, in order to form folded portions 6e, the trimming position of the side of laminated film 6 where tab 4 does not extend outward, is on the outer side of the trimming position of this side of film 5 in order to form these folded portions 6e. In other words, the size on the side in the direction orthogonal to this side (the side from which tab 4 is caused to extend outward) is larger in laminated film 6 than in laminated film 5.

However, in the film-covered battery of this exemplary embodiment, laminated films 5, 6 having the same trimming position of the side from which tab 4 does not extend outward may be used. The manufacturing method of film-covered battery 11 to be adopted when such laminated films 5, 6 are used, is as follows.

First, laminated films 5, 6 having the same trimming position of the side from which tab 4 does not extend outward, are superposed, battery element 2 is inserted between them, and thereafter peripheral edge portions of laminated films 5, 6 are sealed. After that, the outer shape of laminated films 5, 6 is cut so that the portion corresponding to non-covered portion $S_2$ (the non-folded region) shown in FIG. 6 obtains a concave shape. Last, folded portion 6e is formed by folding the portion corresponding to covered portion $S_1$ (the folded region) shown in FIG. 6. By doing like this, it is possible to improve the insulating properties by preventing the metal layer of a laminated film from being exposed even when the trimming position of the side of laminated films 5,6 from which tab 4 does not extend outward is the same. As well, at the same time, it is possible to form a safety valve easily. Also in this exemplary embodiment, it is possible to ensure the insulating properties of an end surface where a metal layer is exposed without impeding the gas jetting from safety valve 7.

Third Exemplary Embodiment

Figure 8:
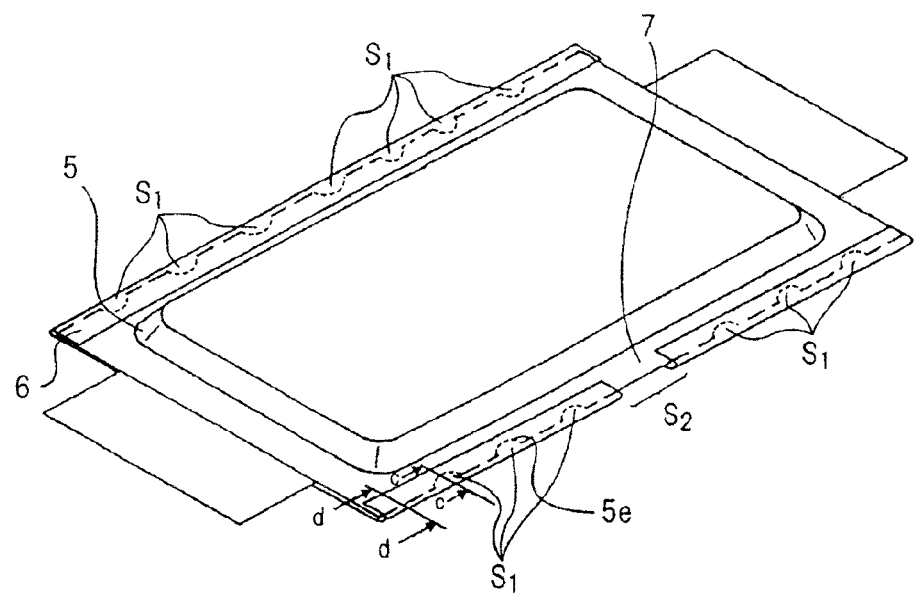
FIG. 8 is an external perspective view of a film-covered battery in the third exemplary embodiment.
Figure 9:
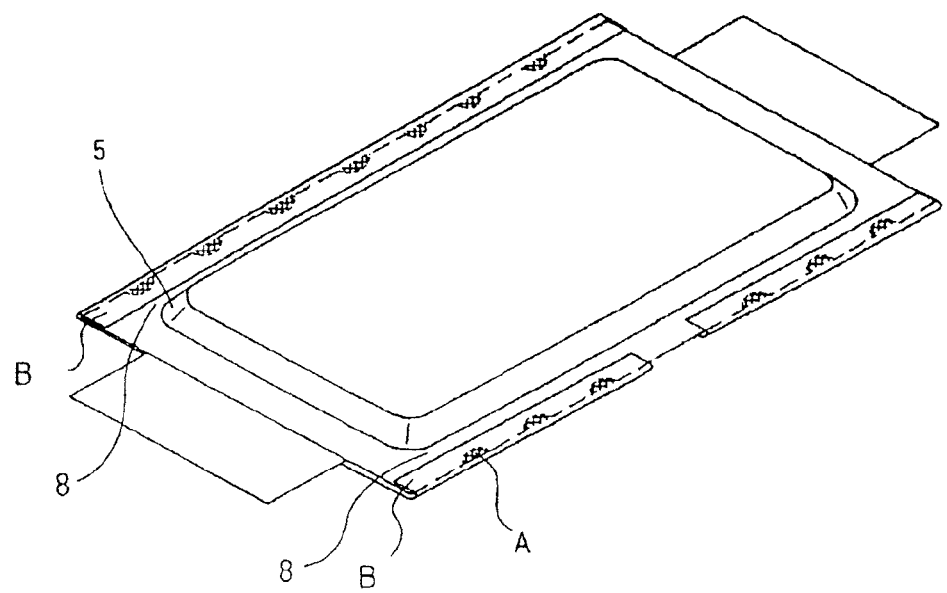
FIG. 9 is a diagram showing a region where thermally-fusible resin layers are thermally fused together in the film-covered battery of the third exemplary embodiment.
Figure 10A:
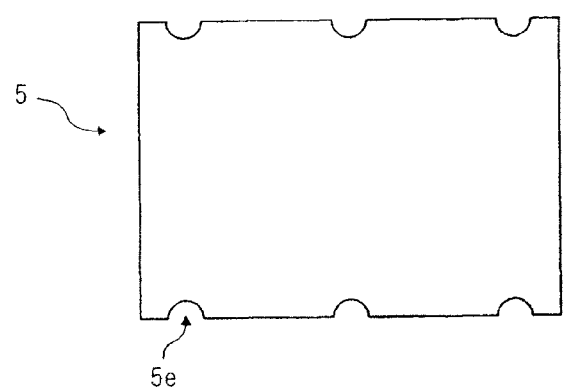
FIG. 10A is a plan view of a laminated film in which a notched portion is formed, which is used in a film-covered battery in the third exemplary embodiment.
Figure 10B:
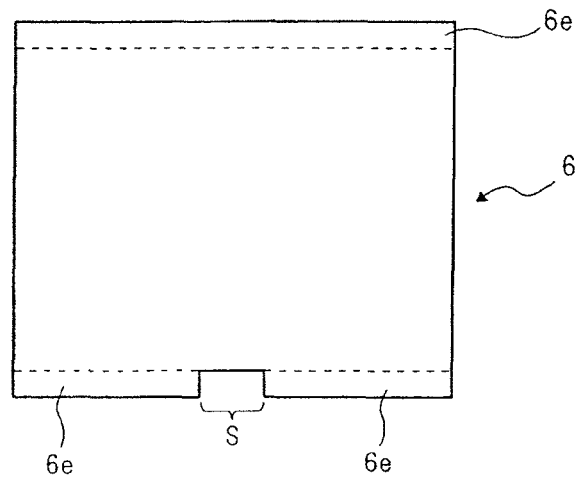
FIG. 10B is a plan view of a laminated film having a folded portion, which is used in a film-covered battery in the third exemplary embodiment.
Figure 11A:
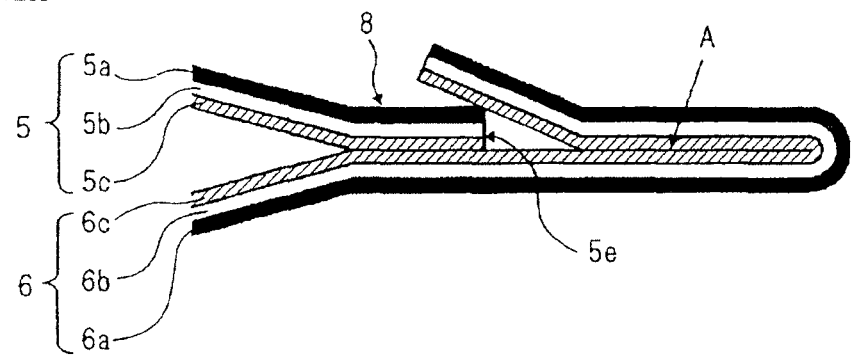
FIG. 11A is a partial sectional view along Line c-c shown in FIG. 8.
Figure 11B:
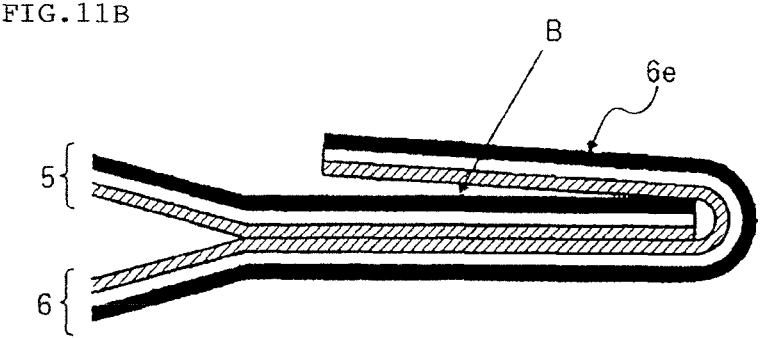
FIG. 11B is a partial sectional view along Line d-d shown in FIG. 8.

FIG. 8 is an external perspective view of a film-covered battery of this exemplary embodiment. FIG. 9 is a diagram showing a region where thermally-fusible resin layers are thermally fused together in the film-covered battery of this exemplary embodiment. FIG. 10A is a plan view of a laminated film in which a notched portion is formed in this exemplary embodiment. FIG. 10B is a plan view of a laminated film of this exemplary embodiment having a folded portion. FIG. 11A is a partial sectional view along Line c-c shown in FIG. 8. FIG. 11B is a partial sectional view along Line d-d shown in FIG. 8.

This exemplary embodiment has the same configuration as the second exemplary embodiment with the exception that notched portions 5e are provided in laminated film 5 at prescribed intervals. Therefore, in the following description, the same members as in the second exemplary embodiment will be described with the aid of the same symbols as in the second exemplary embodiment, and detailed descriptions will be given only of points that are different from the second exemplary embodiment.

As with the second exemplary embodiment, a film-covered battery 12 of this exemplary embodiment is not provided with portion A on both sides thereof, i.e., in portions extending outward from sealing portion 8. For this reason, it is possible to miniaturize the battery by just the amount corresponding to the non-existence of portion A compared to film-covered battery 1 of the first exemplary embodiment.

On both longer sides of laminated film 5, a plurality of notched portions 5e are provided at prescribed intervals as shown in FIGS. 8 and 10A. For this reason, in notched portions 5e, there are formed a plurality of portions A (third sealing portions) where thermally-fusible resin layers 6c are thermally fused together in folded portion 6e of laminated film 6. Therefore, it is possible to increase the bonding strength by just the amount corresponding to portion A compared to film-covered battery 11 of the second exemplary embodiment.

In the case of the second exemplary embodiment, it is possible that springback occurs when the fixing of folded portion 6e to laminated film 5 is insufficient. That is, portion B is provided in order to bond thermally-fusible resin layer 6c of folded portion 6e to protective layer 5a of laminated film 5. For this reason, if only thermal fusion is performed without the application of an adhesive and the like, the bonding strength becomes weak compared to the case of thermally fusing thermally-fusible resin layers together. Therefore, in this portion B, what is called springback may sometimes occur, that is, the front edge part of folded portion 6e springs up due to the exfoliation of folded portion 6e from laminated film 5. If such a state occurs, section 6d where metal layer 6b of folded portion 6e is exposed, faces upward, and may sometimes come into contact with an adjacent battery and surrounding conductive members.

However, in the case of this exemplary embodiment, in portions A in notched portions 5e, thermally-fusible resin layers 6c are thermally fused together. Therefore, strong bonding becomes possible and it is possible to prevent the occurrence of springback without the application of an adhesive to portion B.

In the case of a film-covered battery, the moisture of the outside air tends to enter the interior of the battery from between thermally-fusible resin layer 5c and thermally-fusible resin layers 6c. The entry speed of this moisture is inversely proportional to the length of the path from the outside air side of the thermally-fused portion to the internal space side of the battery. Therefore, if the amount of the entering moisture is to be reduced in order to maintain the performance of the battery, the larger the path length, the more desirable.

In the c-c section shown in FIG. 11A, the moisture of the outside air enters end portion 5e and, therefore, the moisture entry speed of this portion is determined by the length of the path from end portion 5e to the internal space in the battery. From this fact, the moisture entry speed is higher than in the d-d section of FIG. 11. However, the portion of the c-c section is only partially formed by notches. Therefore, in this exemplary embodiment, an increase in the moisture entry speed is suppressed as a whole battery compared to a configuration in which end portions 5e and portions A are provided in the whole region of sides. The effect of springback prevention can be sufficiently achieved by partially providing fused portions by notched portions 5e and, therefore, it is possible to obtain the targeted effect with hardly any increase in the moisture entry speed.

Although the shape of notched portions 5e shown in each diagram is semicircular, the shape is not especially limited. The number and intervals of notched portions 5e are not especially limited, either, so long as they can prevent the occurrence of springback while the moisture entry speed is in taken into consideration.

In each of the above-described first to third exemplary embodiments, the description was given of an example of a configuration in which the covering film is made of two sheets of different laminated films 5, 6. However, laminated films 5, 6 may also be formed from one sheet of laminated film. That is, a covering film is folded back to form laminated film 5 and laminated film 6 as a portion facing this laminated film 5. In this case, safety valve 7 is formed on the side of laminated film opposite to the side where the covering film is folded twofold. When one sheet of laminated film is folded back twofold, no folded portion is formed on the side of laminated film opposite to the side where safety valve 7 is provided. Of course, the metal layer is not exposed, either, on the side where the covering film is folded back twofold.

Fourth Exemplary Embodiment

Figure 12:
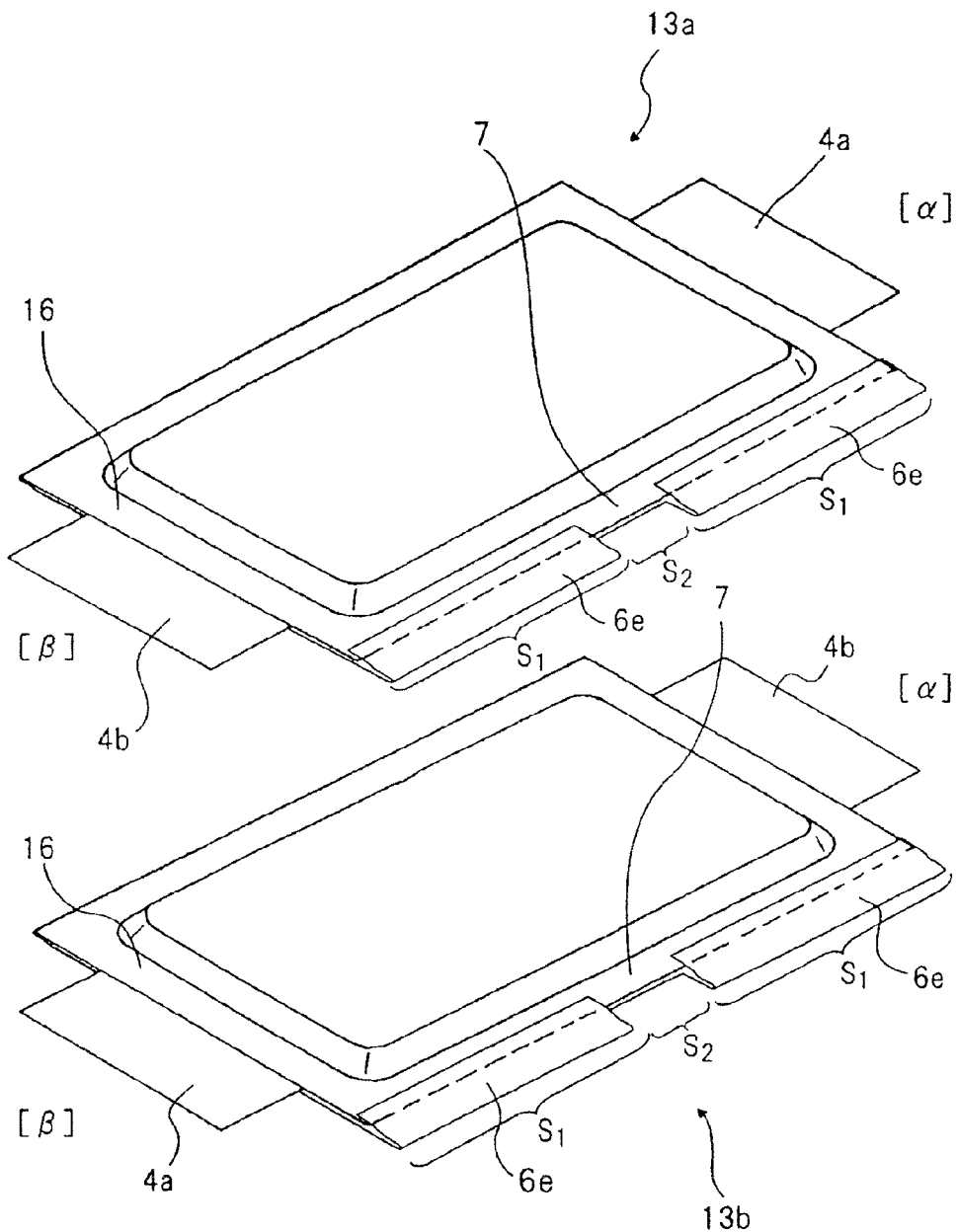
FIG. 12 is an external perspective view of two kinds of film-covered batteries, which are used in an assembled battery of the fourth exemplary embodiment.
Figure 13:
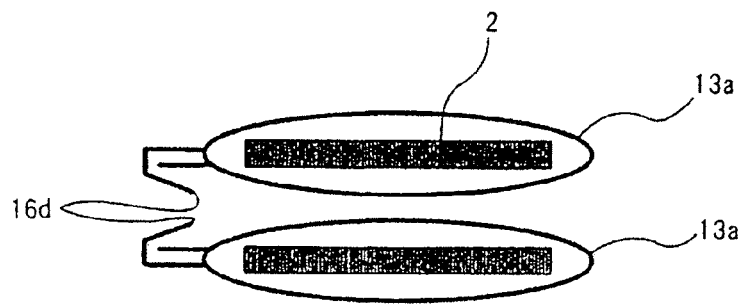
FIG. 13 is a schematic diagram showing the arrangement of sections of films obtained when film-covered batteries of the same kind are connected in series and stacked in the thickness direction to form an assembled battery.
Figure 14:
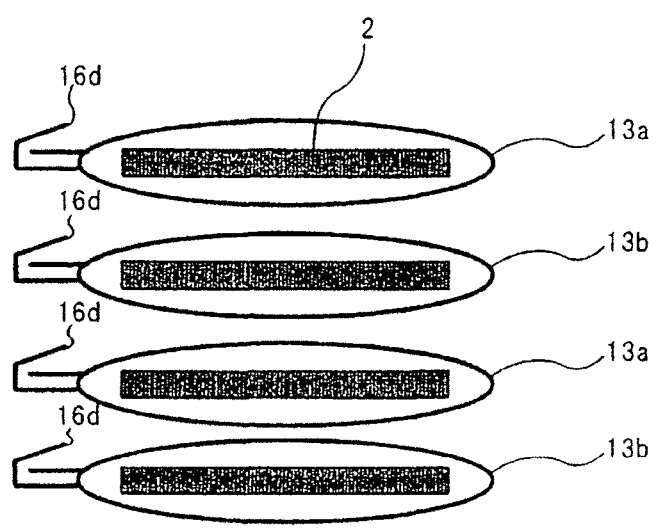
FIG. 14 is a schematic diagram showing the arrangement of sections of films obtained when the two kinds of film-covered batteries in the fourth exemplary embodiment are connected in series and stacked in the thickness direction to form an assembled battery.

FIG. 12 shows an external perspective view of two kinds of film-covered battery devices, which are used in a battery of this exemplary embodiment. FIG. 13 shows a schematic diagram to explain a problem occurring when an assembled battery is formed from one kind of film-covered batteries. FIG. 14 shows a schematic diagram of the construction of an assembled battery of two kinds of film-covered battery devices of this exemplary embodiment.

Film-covered batteries 13a, 13a of this exemplary embodiment are each obtained by folding one sheet of laminated film 16 twofold. Although folded portions 6e are partially provided in this one sheet of laminated film 16, a detailed description will be omitted, because the basic construction is the same as in each of the above-described exemplary embodiments. Although FIG. 12 shows, as an example, the construction of the folded portions which is the same as described in the first exemplary embodiment, the constructions shown in the second exemplary embodiment or the third exemplary embodiment may also be adopted.

Think of the case where an assembled battery is formed from one kind of film-covered battery in which one side has both a folded region and a non-folded region and is the side where a safety valve is provided. In this case, when the two film-covered batteries are stacked, with the sides where a safety valve is provided facing the same side and with the front side and the back side inversely set, as shown in FIG. 13, there occurs the problem that there is a possibility that sections 16 will come into electrical contact with each other. However, if the two film-covered batteries are stacked, with the sides where the safety valve is provided, facing in the opposite direction, then the direction of the safety valves does not become aligned. Therefore, as will be described below, this problem can be avoided by using two kinds of film-covered batteries.

In this exemplary embodiment, a description will be given of two kinds of film-covered batteries 13a, 13b.

As shown in FIG. 12, the difference between film-covered battery 13a and film-covered battery 13b resides in the point that positive electrode tab 4a and negative electrode tab 4b are positioned in directions that are different from each other although the position of safety valves 7 is the same. In FIG. 12, in both film-covered battery 13a and film-covered battery 13b, safety valves 7 are arranged on the right side in the figure. However, in film-covered battery 13a, positive electrode tab 4a extends outward from the α side in the figure and negative electrode tab 4b extends outward from the β side. Contrary to this, in film-covered battery 13b, negative electrode tab 4b extends outward from the α side in the figure and positive electrode tab 4a extends outward from the β side in the figure. Film-covered battery 13a and film-covered battery 13b have the same construction with the exception that the polarity of the tabs is reversed.

When film-covered electrodes are fabricated into an assembled battery, it is sometimes convenient to align the direction of safety valves. That is, when the direction of safety valves is aligned, it becomes easy to collect the gas discharged from a plurality of safety valves in one place and to introduce the gas in the collected condition to the outside of a device in which the assembled battery is used or a vehicle. However, if film-covered batteries 13a of the same kind are connected in series and stacked in the thickness direction, as shown in FIG. 13, the sections of laminated films 16 come very close to each other in opposed relation and the possibility that the sections will come into electrical contact with each other becomes strong.

Therefore, in this exemplary embodiment, two kinds of film-covered battery 13a and film-covered battery 13b are connected one after another into an assembled battery. By doing like this, as shown in FIG. 14, the film-covered batteries are arranged, such that sections 16d of laminated films 16 do not face each other. That is, the assembled battery of this exemplary embodiment is constructed in such a manner that only one section 16d is present between film-covered battery 13a and film-covered battery 13b which are stacked adjacently. For this reason, in the assembled battery of this exemplary embodiment, it is possible to prevent sections 16d of laminated films 16 from coming into electrical contact with each other.

In the configuration shown in FIG. 12, the uppermost battery and the second battery are made in the manufacturing process thereof so that the folding direction of the side where the safety valve is provided is reverse to the direction in which the positive and negative electrode tabs are drawn out. Because such two kinds of batteries are prepared in a series connection, the batteries are alternately stacked, with the direction of the side where the safety valve is provided and the folding direction aligned, whereby the positive and negative electrode tabs which are drawn out are alternately arranged. Therefore, it is possible to easily connect the positive electrode tab of one battery and the negative electrode tab of the other battery at a short distance, the batteries being adjacent to each other.

Although the above description was given of the case of a series connection as an example, the present invention is not limited to this. That is, even in the case of a parallel connection, by stacking the film-covered batteries in such a manner that sections 16d do not face each other, it is possible to prevent sections 16d from coming into electrical contact with each other.

Concretely, for example, one kind of film-covered battery, in which one side has both a folded region and a non-folded region and is the side where a safety valve is provided, is prepared, and these batteries are stacked and connected in parallel, with the direction of the side where the safety valve is provided and the folding direction of the side aligned.

In this exemplary embodiment, the description was given of the film-covered battery of the type in which one side is folded twofold. However, it is needless to say that the same effect is obtained also from a battery of the type in which also the side of a laminated film opposite to a side having a safety valve is the thermally-fused side.

Although the present invention was described above by referring to the exemplary embodiments, the present invention is not limited to the above-described exemplary embodiments. The configurations and details of the present invention can be subject to various modifications which those skilled in the art can understand in the scope of the present invention.

This application is based upon and claims benefit of priority from the Japanese Patent Application No. 2008-066505, filed on Mar. 14, 2008, the entire contents of which are incorporated herein by reference.

The invention claimed is:

1. A film-covered electrical device, comprising:
an electrical device element formed by laminating a plurality of positive electrode plates and a plurality of negative electrode plates in an opposed condition; and
a covering film having a metal layer, a resin layer having thermal fusion properties and which is provided on one surface of the metal layer and a protective layer provided on another surface of the metal layer,
wherein the electrical device-element is housed in a space formed by thermally fusing edge portions of the covering film to each other, one side of a peripheral edge portion of the covering film comprises both a folded region having a folded portion and a non-folded region not having the folded portion, and the folded portion is positioned in a direction in which the folded portion departs more from the electrical device element than from an end surface of the covering film in the non-folded region.

2. The film-covered electrical device according to claim 1, wherein folded portion is folded so that an end surface of the covering film faces a direction in which the electrical device element is housed.

3. The film-covered electrical device according to claim 1, wherein the covering film comprises a first covering film and a second covering film,
wherein the second covering film includes the side comprising both the folded region and the non-folded region, the first covering film and the second covering film are bonded to each other through a first sealing portion where the resin layer of the first covering film and the resin layer of the second covering film are thermally fused together, and
wherein the end surface of the first covering film has a covered portion covered with the folded portion of the second covering film and a non-covered portion that is not covered with the folded portion of the second covering film.

4. The film-covered electrical device according to claim 3, further comprising a second sealing portion where the protective layer of the first covering film and the resin layer of the second covering film are bonded to each other.

5. The film-covered electrical device according to claim 3, further comprising a third sealing portion where the resin layers in the folded portion of the second covering film are thermally fused to each other.

6. The film-covered electrical device according to claim 5, wherein a notched portion is formed in the first covering film and the third sealing portion is formed in the notched portion.

7. The film-covered electrical device according to claim 6, wherein is a plurality of the notched portions are formed in a plurality of numbers in the first covering film, and each of the notched portions is spaced at a prescribed interval from each other.

8. The film-covered electrical device according to claim 3, wherein the first covering film and the second covering film are separate films.

9. The film-covered electrical device according to claim 3, wherein the first covering film and the second covering film are one sheet of film which is folded back.

10. An assembled battery formed by connecting a plurality of the film-covered electrical devices according to claim 3, wherein each of the film-covered electrical devices is laminated so that only one end surface of the covering film is present between the film-covered electrical devices which are laminated in an adjoining condition.

11. The assembled battery according to claim 10, comprising a first film-covered electrical device and a second film-covered electrical device,
the first film-covered electrical device having a positive electrode tab which is connected to the positive electrode plate and which extends outward from the covering film to the outside, and a negative electrode tab which is connected to the negative electrode plate and which extends outward from the covering film to the outside in a direction opposite to the positive electrode tab, and the second film-covered electrical device being such that a direction in which the positive electrode tab and the negative electrode tab extend outward is reverse to a direction of the positive electrode tab and the negative electrode tab of the first film-covered electrical device,
wherein the first film-covered electrical device and the second film-covered electrical device are alternately stacked, whereby the non-covered portion is arranged on the same side as the peripheral edge portion and the first film-covered electrical device and the second film-covered electrical device are connected in series.

12. A film-covered electrical device, comprising:

an electrical device element formed by laminating a plurality of positive electrode plates and a plurality of negative electrode plates in an opposed condition; and a covering film having a metal layer, a resin layer having thermal fusion properties and which is provided on one surface of the metal layer and a protective layer provided on another surface of the metal layer, wherein the electrical device-element is housed in a space formed by thermally fusing edge portions of the covering film to each other, one side of peripheral edge portions of the covering film comprises both a folded region having a folded portion and a non-folded region not having the folded portion, and the resin layers in the folded portion of the covering film are thermally fused to each other.

13. The film-covered electrical device according to claim 12, wherein the folded portion is folded so that an end surface of the covering film faces a direction in which the electrical device element is housed.

14. The film-covered electrical device according to claim 12, wherein the folded portion is positioned in a direction in which the folded portion departs more from the electrical device element than from an end surface of the covering film in the non-folded region.

15. The film-covered electrical device according to claim 12, wherein the covering film comprises a first covering film and a second covering film, wherein the second covering film includes the side comprising both the folded region and the non-folded region, the first covering film and the second covering film are bonded to each other through a first sealing portion wherein the resin layer of the first covering film and the resin layer of the second covering film are thermally fused to each other, and wherein an end surface of the first covering film has a covered portion which is covered by the folded portion of the second covering film and a non-covered portion that is not covered by the folded portion of the second covering film.

16. The film-covered electrical device according to claim 15, further comprising a second sealing portion where the protective layer of the first covering film and the resin layer of the second covering film are bonded to each other.

17. The film-covered electrical device according to claim 15, wherein a notched portion is formed in the first covering film and the resin layers in the folded portion of the covering film are thermally fused to each other in the notched portion.

18. The film-covered electrical device according to claim 17, wherein a plurality of the notched portions are formed in the first covering film, and each of the notched portions is spaced at a prescribed interval from each other.

19. The film-covered electrical device according to claim 15, wherein the first covering film and the second covering films are separate films.

20. The film-covering electrical device according to claim 15, wherein the first covering film and the second covering film are one sheet of film which is folded back.

* * * * *

UNITED STATES PATENT AND TRADEMARK OFFICE
CERTIFICATE OF CORRECTION

| | |
|---|---|
| PATENT NO. | : 8,574,746 B2 |
| APPLICATION NO. | : 12/920448 |
| DATED | : November 5, 2013 |
| INVENTOR(S) | : Masatomo Mizuta and Shunji Noda |

It is certified that error appears in the above-identified patent and that said Letters Patent is hereby corrected as shown below:

In the Claims

Column 12, Line 2: In Claim 2, before "folded" insert -- the --

Column 12, Line 32: In Claim 7, before "a" delete "is"

Column 12, Line 32-33: In Claim 7, after "formed" delete "in a plurality of numbers"

Signed and Sealed this
Eleventh Day of November, 2014

Michelle K. Lee
*Deputy Director of the United States Patent and Trademark Office*